United States Patent [19]

Harada

[11] Patent Number: 5,527,367
[45] Date of Patent: Jun. 18, 1996

[54] MIXER FOR A GAS-FUELED ENGINE

[75] Inventor: Shinichi Harada, Tokyo, Japan

[73] Assignee: Nippon Carbureter Co., Ltd., Tokyo, Japan

[21] Appl. No.: 345,490

[22] Filed: Nov. 28, 1994

[30] Foreign Application Priority Data

Dec. 3, 1993 [JP] Japan .................... 5-339582

[51] Int. Cl.⁶ .................................................. F02M 21/04
[52] U.S. Cl. .................................. 48/189.3; 123/527
[58] Field of Search ................. 48/180.1, 189.3; 261/16, DIG. 39, 78.1; 123/527

[56] References Cited

U.S. PATENT DOCUMENTS

| | | | |
|---|---|---|---|
| 2,152,057 | 3/1939 | Killmeyer et al. | 261/DIG. 39 |
| 2,233,523 | 3/1941 | Forgar | 48/180.1 |
| 2,260,408 | 10/1941 | Seffker | 48/189.3 |
| 2,518,082 | 8/1950 | Shively | 48/189.3 |
| 3,561,409 | 2/1971 | August et al. | 48/189.3 |
| 3,564,580 | 2/1971 | Cinque | 48/189.3 |
| 3,648,988 | 3/1972 | Dibert | 261/DIG. 39 |
| 3,759,499 | 9/1973 | Lang | 48/189.3 |
| 3,831,909 | 8/1974 | Freismuth | 48/189.3 |
| 4,966,735 | 10/1990 | LoRusso | 261/DIG. 39 |
| 4,991,561 | 2/1991 | Gerassimov et al. | 48/180.1 |

FOREIGN PATENT DOCUMENTS

| | | | |
|---|---|---|---|
| 56-11646 | 3/1981 | Japan . | |
| 234125 | 5/1925 | United Kingdom | 48/189.3 |

OTHER PUBLICATIONS

Copy of FIGS. 1 & 2 of Japanese Publication No. 49–9122 (1 pg.).
Copy of FIGS. 1 & 2 of Japanese Publication No. 52–13580 (1 pg.).

Primary Examiner—Peter Kratz
Attorney, Agent, or Firm—Flynn, Thiel, Boutell & Tanis

[57] ABSTRACT

A mixer for a gas fueled engine uses a venturi through which a fuel nozzle opens into an air inlet path at a narrowest portion of the venturi in a substantially parallel orientation relative to the flow of inlet air in the air inlet path to reduce the mixture loss, and an air nozzle opens into the air inlet path at an expanding portion of the venturi in a substantially parallel orientation relative to the flow of the inlet air to reduce the ventilation resistance caused by a boundary layer and to make a uniform mixture of the gaseous fuel and the air.

5 Claims, 2 Drawing Sheets

MIXER FOR A GAS-FUELED ENGINE

BACKGROUND OF THE INVENTION

1. Field of the Invention

This invention relates to a mixer for feeding a gas-fueled engine with a gaseous fuel such as liquefied petroleum gas (LPG) or compressed natural gas (CNG).

2. Description of the Related Art

Any mixer for mixing a gaseous fuel with air prior to the supply to a gas engine has a nozzle which opens into an air inlet path through a venturi in a direction across the axial line of the air inlet path in order to permit an appropriate amount of fuel to enter the air inlet path.

Like vaporizers of gasoline engines and unlike ideal venturi's used for measuring fluid flow rate, a venturi used in an air inlet path of a mixer for a gas engine must be configured to have a large expanding angle at a downstream of the narrowest portion in order to minimize the length of the air inlet path so as to meet the spatial requirements that the outer dimension of the mixer fits well in its mounting space.

Since gaseous fuels, in general, however, are by far bulky than liquid fuels, an enormous volume must be introduced through the nozzle. If the nozzle opens at the narrowest portion of the venturi, then the gaseous fuel, exiting from the nozzle, hits the inlet air flow and causes a large mixture loss. To minimize the mixture loss, ordinary designs make the nozzle to open into a portion of the air inlet path offset from the flow line of the inlet air at a downstream of the narrowest portion (see FIG. 1 of Japanese Patent Post-Examination Publication 49(1974)-9122 and FIG. 1 of Japanese Patent Post-Examination Publication No. 52(1977)-13580). Thus, enlargement of the expanding angle of the venturi contributes both to resolution of the mounting spatial problem of the mixer and to reduction of the mixture loss.

In this arrangement, however, the air, maximized in flow rate at the narrowest portion of the air inlet path, is gradually slowed down in the expanded portion. More specifically, a part of the air in contact with or near the wall of the venturi is slowed down more than the central portion because of its viscosity and hence makes a boundary layer. The boundary layer gradually grows as it runs downstream, because of a further decrease in flow rate, and it produces a ventilation resistance which behaves to stress the flow of the inlet air, i.e. the main flow, running toward the engine. When the boundary layer further grows, the flow rate of the air in contact with and near the wall of the venturi becomes zero, and a further progress of this phenomenon even makes an opposite flow. As a result, the main flow is separated from the wall of the venturi, and the ventilation resistance increases.

Therefore, sufficient enlargement of the expanding angle is not practical with the venturi structure which aims shortening the air inlet path by expanding the venturi at the downstream of its narrowest portion and aims reduction of the mixture loss by opening the fuel nozzle into the air inlet path at the downstream of the narrowest portion, because a large expansion invites a boundary separation, which leads to a decrease in engine output caused by an increase in ventilation resistance.

That is, the prior art mixer has been encumbered with the contradictory problems that an increase in the expanded angle certainly reduces the mixture loss but also increases the ventilation resistance; and a decrease in the expanded angle certainly reduces the ventilation resistance but also increases the mixture loss, and no mixer has been known which uses a venturi structure providing a small mixture loss and a small ventilation resistance.

OBJECT OF THE INVENTION

It is, therefore, an object of the invention to provide a mixer of a gas-fueled engine, which is free from an increase in ventilation resistance due to a boundary separation and hence small both in mixture loss and in ventilation resistance, even with a venturi structure configured to expand and shorten the air inlet path so as to meet the spatial requirements for mounting the mixer in the engine.

SUMMARY OF THE INVENTION

According to the invention, there is provided a mixer for a gas-fueled engine, comprising: an air inlet path through which inlet air flows in a predetermined direction; a venturi defining at least a part of the air inlet path and including a narrowest portion with a smallest inner diameter and including an expanding portion at a downstream of the narrowest portion having a larger inner diameter than the narrowest portion; a fuel nozzle opening into the air inlet path through the venturi in the proximity of the narrowest portion to permit a gaseous fuel to flow therethrough into the air inlet path substantially in parallel with the predetermined direction; and an air nozzle opening into the air inlet path through the venturi in the expanding portion to permit air to be blown therethrough into the air inlet path in parallel with the predetermined direction.

The fuel nozzle may be provided either in the narrowest portion or another upstream or downstream location close to the narrowest portion.

The fuel nozzle and the air nozzle are preferably ring-shaped, extending along the entire circumference of the venturi. The venturi is preferably a multi-layered structure which comprises a first venturi element defining an inlet portion where the cross-sectional area of the air inlet path is decreased; and at least two, second and third, venturi elements stacked one on the other and to the first venturi element via gaps and defining the expanding portion, such that the gap between the first and second venturi elements forms the fuel nozzle and the gap between the second and third venturi elements forms the air nozzle.

When inlet air flows toward the engine, a maximum negative pressure is produced at the narrowest portion of the venturi. A gaseous fuel is introduced in parallel with the running direction of the inlet air through the fuel nozzle opening near the narrowest portion, then smoothly merges with the inlet air without substantial collision with the inlet air, and flows through the expanding portion toward the engine. Although this flow once creates a boundary layer in the expanding portion, the boundary layer is diminished or removed by the air blown through the air nozzle substantially in parallel with the flow of the inlet air and the gaseous fuel.

That is, the mixture loss caused by collision of the gaseous fuel with the inlet air and the ventilation resistance caused by generation of a boundary layer are reduced significantly.

The gaseous fuel is sandwiched by the inlet air running through and beyond the narrowest portion and by the air blown through the air nozzle, and then gradually merges with these flows, not creating a wall-layer flow even in the

DETAILED DESCRIPTION OF THE PREFERRED EMBODIMENTS

Figure 1:
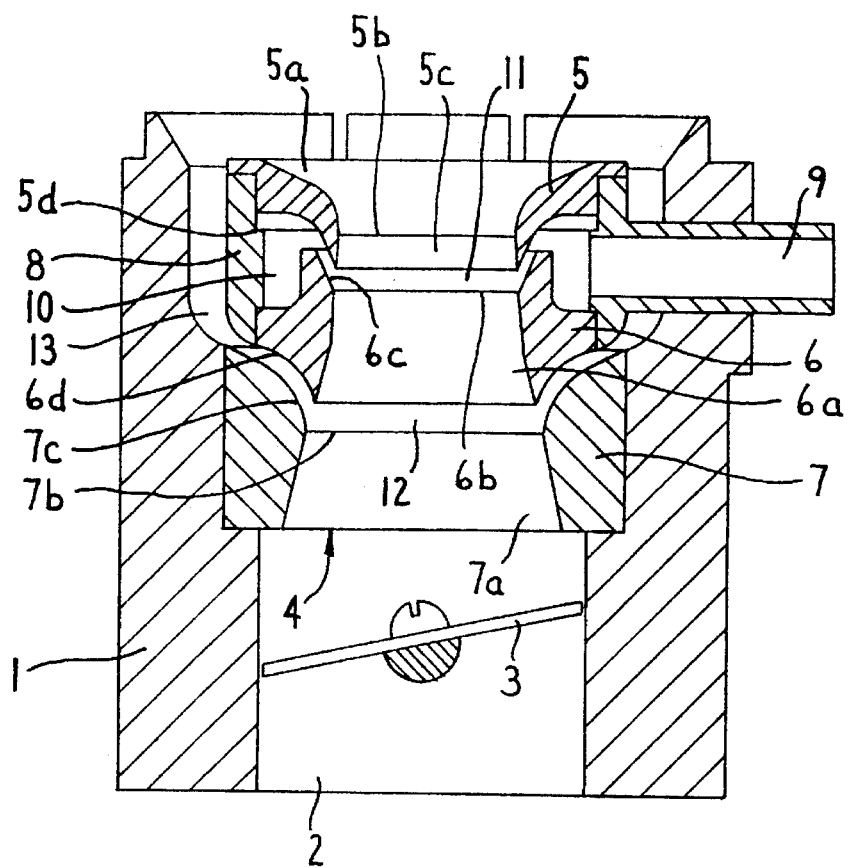
FIG. 1 is a longitudinal cross-sectional view of a mixer according to an embodiment of the invention.

With reference to FIG. 1, showing a mixer according to an embodiment of the invention, the mixer includes a mixer body 1, an inlet path 2, a throttle valve 3, and a venturi 4. The venturi 4 comprises a first venturi element 5, a second venturi element 6 and a third venturi element 7, from the upstream down, which are stacked via gaps.

The first venturi element 5 has an inlet portion 5a rapidly decreasing the cross-sectional area of the air inlet path 2, a narrowest portion 5b, and an initial expanding portion 5c defining a part of an expanding portion of the venturi 4. The second venturi element 6 has an intermediate expanding portion 6a defining an intermediate portion of the expanding portion of the venturi 4, and a ring-shaped outer wall member 8 air-tightly secured to the outer circumferential margin of the second venturi element 6. A fuel inlet tube 9 radially extending from the outer wall member 8 extends through and beyond the mixer body 1 and holds the second venturi element 6 concentrically in the interior of the mixer body 1.

The first venturi element 5 is air-tightly secured along its circumferential edge to the outer wall member 8 via a distance from the second venturi element 6 and is held in the mixer body 1 together. The ring-shaped space surrounded by the two venturi elements 5, 6 and the outer wall member 8 forms a fuel inlet chamber 10 communicating with the fuel inlet tube 9. The radially innermost portion of the fuel inlet chamber 10 exhibits a narrow gap defined by the outer circumferential surface 5d of the initial expanding portion 5c of the first venturi element 5 and by the inner circumferential surface 6c of the upstream terminal portion of the second venturi element 6 which extends upstream from a narrowest portion 6b of the intermediate expanding portion 6a while gradually enlarging its inner diameter. The gap defined by the surfaces 5d and 6c is sloped down toward the flowing direction of the inlet air and so opens into the air inlet path 2 to behave as the fuel nozzle 11.

A gaseous fuel, adjusted and held in a pressure substantially equal to the atmosphere by a vaporizer or regulator, is introduced through the fuel inlet tube 9 into the fuel inlet chamber 10, and then introduced into the air inlet path 2 through the ring-shaped fuel nozzle 11 in parallel with the flowing direction of the inlet air. The inlet air exhibits a maximum flow rate and a maximum negative pressure at the narrowest portion 5b of the first venturi element 5, and then runs through the expanding portion of the venturi 4 while gradually slowed down and making a boundary layer in the initial expanding portion 5c and the intermediate expanding portion 6a.

The gaseous fuel is forced to enter the air inlet path 2 through the fuel nozzle 11 due to a difference between its own pressure adjusted by the vaporizer (or regulator) and the negative pressure at the narrowest portion 6b of the second venturi element 6, then runs toward the engine while surrounding the inlet air, and behaves to temporarily diminish or remove the boundary layer.

The third venturi element 7 has a terminal expanding portion 7a defining the latter half of the expanding portion of the venturi 4, and is engagingly fixed in the mixer body 1. A narrow gap is defined by the inner circumferential surface 7c extending upstream, while enlarging the inner diameter, from a narrowest portion 7b at the upstream end of the terminal expanding portion 7a and by the outer circumferential surface 6d of a downstream end of the intermediate expanding portion 6a of the second venturi element 6. The gap defined by the surfaces 7c and 6d is sloped down toward the flowing direction of the inlet air, and so opens into the air inlet path 2 to behave as the air nozzle 12. The gap also communicates with an outer annular path 13 between the mixer body 1 and the outer wall member 8.

The boundary layer, once diminished or substantially removed by the gaseous fuel introduced through the fuel nozzle 11, grows again while the inlet air and the gaseous fuel flow through the intermediate expanding portion 6a. However, since air is introduced from the inlet of the air inlet path 2 through the outer annular path 13 and then through the air nozzle 12 due to a negative pressure in the narrowest portion 7b of the third venturi element 7 and runs toward the engine while surrounding the gaseous fuel, the boundary layer is diminished or substantially removed again.

The boundary layer once again grows while the concentrically three-layered flow runs through the terminal expanding portion 7a. However, the flow runs beyond the venturi 4 and passes through the throttle valve 3 into the air inlet manifold and then into the engine before the ventilation resistance increases. In this process, the gaseous fuel flows toward the engine while first exhibiting a cylindrical shape sandwiched by air layers and then gradually merging with the air. Therefore, the gaseous fuel does not make a wall-contacting flow in the air inlet manifold, which ensures the supply of uniformly mixed gas to the engine.

The foregoing embodiment uses a single air nozzle, the nozzle 12, opening at one location of the intermediate expanding portion of the venturi 4; however, depending on the expanding angle, a fourth venturi element may be provided to define a second air nozzle between the third and fourth venturi elements, having the same or similar shape as the illustrated nozzle 12.

Although the nozzles 11 and 12 employed in the foregoing embodiment each open into the air inlet path 2 in the form of a continuous ring throughout the entirety of the circumference, they may be a series of some divisional arc-shaped apertures which form an intermittent ring as a whole. The fuel nozzle 11, opening into the air inlet path 2 with a uniform width throughout the entire circumference in the foregoing embodiment, may be different in width from place to place in the circumferential direction so as to satisfy specific fuel distributing characteristics desired for an engine by making the flow amount of fuel from the fuel nozzle 11 to be different in the circumferential direction.

The three venturi elements 5, 6 and 7 employed in the foregoing embodiment are configured such that the initial expanding portion 5c, intermediate expanding portion 6a and terminal expanding portion 7a make a smooth expanding configuration as a whole, and the nozzles 11 and 12 open into the air inlet path 2 with quite a small angle from, i.e. nearly in parallel with, the flowing direction of the inlet air. However, a further decrease in mixture loss caused by collision of a gaseous fuel and air introduced through these nozzles would be realized by parallel orientation of the nozzles with the flow line of the inlet air at a location offset from the flow of the inlet air. It is also possible to provide the fuel nozzle 11 at any location making a high negative pressure other than the downstream of the narrowest portion of the venturi 4 because the gaseous fuel is introduced to the air inlet path 2 substantially in parallel with the flow of the inlet air.

Figure 2:
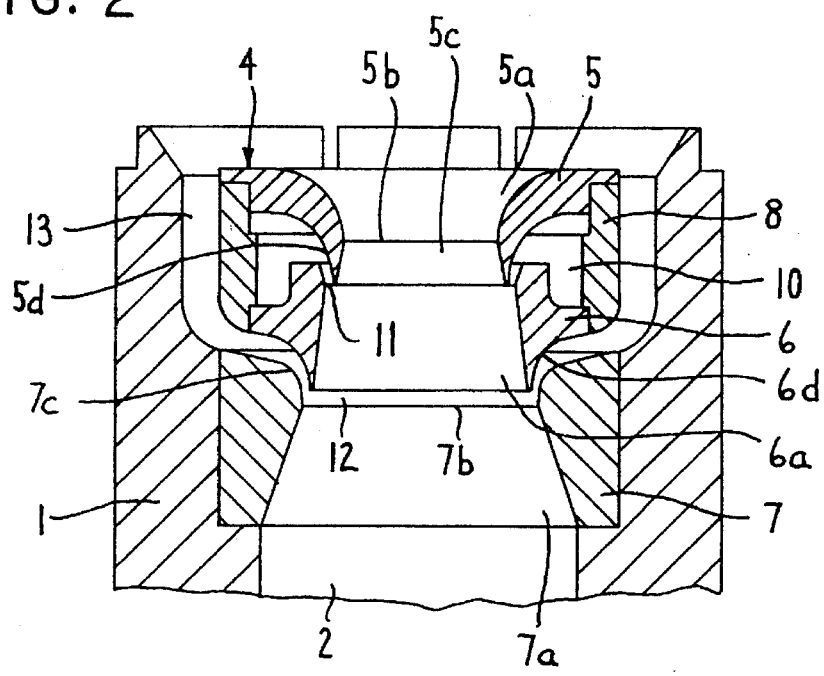
FIG. 2 is a fragmentary, longitudinal, cross-sectional view of a mixer according to another embodiment of the invention.

FIGS. 2 et seq. show other embodiments reflecting these considerations.

With reference to FIG. 2 showing another embodiment, the intermediate expanding portion 6a of the second venturi element 6 is located radially outwardly of the initial expanding portion 5c of the first venturi element 5, and the terminal expanding portion 7a of the third venturi element 7 is located radially outwardly of the intermediate expanding portion 6a, such that two step portions are formed along the wall surfaces of the expanding portion of the venturi 4. Thus the fuel nozzle 11 and the air nozzle 12 are opened into the air inlet path 2 at the step portions in parallel with the flow of the inlet air.

Figure 3:
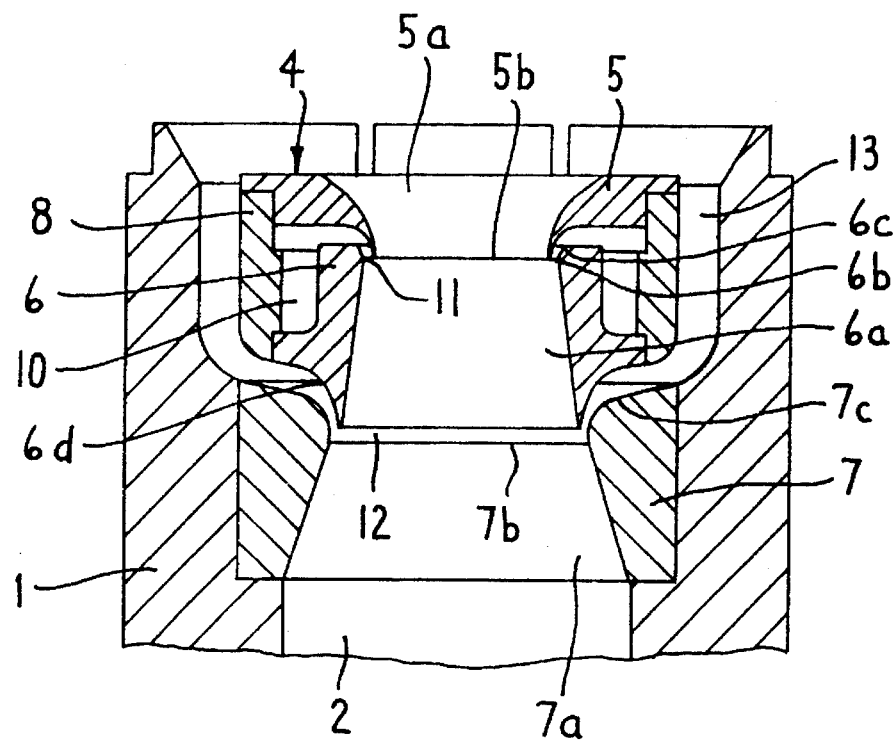
FIG. 3 is a fragmentary, longitudinal, cross-sectional view of a mixer according to a further embodiment of the invention.

With reference to FIG. 3 showing a further embodiment, the first venturi element 5 terminates at the narrowest portion 5b and does not include the initial expanding portion. The intermediate expanding portion 6a of the second venturi element 6 is located radially outwardly of the narrowest portion 5b of the first venturi element 5, and the terminal expanding portion 7a of the third venturi element 7 is located radially outwardly of the intermediate expanding portion 6a, such that two step portions are made along the wall surfaces of the venturi 4. Thus the fuel nozzle 11 and the air nozzle 12 are opened into the air inlet path 2 in parallel with the flow of the inlet air, and the fuel nozzle 11 opens at the narrowest portion 5b.

Figure 4:
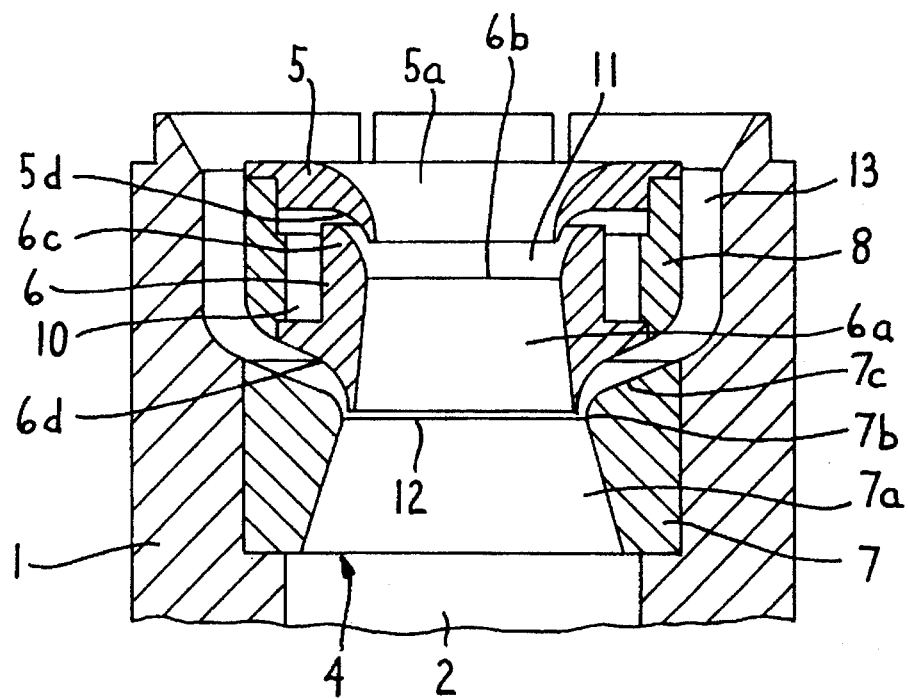
FIG. 4 is a fragmentary, longitudinal, cross-sectional view of a mixer according to a still further embodiment of the invention.

With reference to FIG. 4 showing a still further embodiment, the first venturi element 5 consists only of the inlet portion 5a and is disposed to cooperate with the expanding inner circumferential surface 6c of the second venturi element 6 to define smooth wall surfaces extending to the narrowest portion 6b. The terminal expanding portion 7a of the third venturi element 7 is located radially outwardly of the intermediate expanding portion 6a of the second venturi element 6 to make a step portion along the wall surfaces of the expanding portion of the venturi 4. Thus the fuel nozzle 11 is opened into the air inlet path 2 aslant of the flow of the inlet air while the air nozzle 12 is opened into the air inlet path 2 at the step portion in parallel with the flow of the inlet air. The narrowest portion 6b of the second venturi element 6 forms the narrowest portion of the entirety of the venturi 4, and the fuel nozzle 11 opens upstream of the narrowest portion 6b.

The nozzle provided at the step portion may alternatively be opened outwardly aslant so as to introduce the gaseous fuel and air along the configuration of the expanding portion.

By employing the above-explained structures of the venturi according to the invention, since a gaseous fuel and air introduced through the nozzles smoothly merge with inlet air and flow to the engine, with no substantial collision, mixture loss of the mixer is very small.

Moreover, since the air introduced through the air nozzle, or nozzles, in the expanding portion of the venturi behaves to diminish or remove a boundary layer, ventilation resistance is quite small even with a large expanding angle required for shortening the air inlet path in order to make an outer configuration of the mixer to fit in its mounting space. In addition to this, since the air through the air nozzle runs to the engine through the air inlet manifold while sandwiching the gaseous fuel, from the inner side with the inlet air and from the outer side with the air through the air nozzle, and gradually merging with them, the gaseous fuel never makes a wall-contacting flow, and a uniformly mixed gas is reliably supplied to the engine. As a result, engine output and the quality of exhaust gas are improved.

What is claimed is:

1. A mixer for a gas-fueled engine comprising:

means defining an air inlet path through which inlet air flows in a predetermined main air flow direction from an upstream end of said air inlet path toward a downstream end thereof; and a venturi having a venturi interior passage which defines at least a part of said air inlet path and has an inner diameter that varies along a length thereof, said venturi including at least a first venturi element, a second venturi element disposed downstream of said first venturi element, and a third venturi element disposed downstream of said second venturi element, each of said first, second and third venturi elements having an upstream end portion, a downstream end portion, an inner surface which defines said venturi interior passage and an outer surface, said first venturi element defining a narrowest portion of said venturi such that said inner diameter of said venturi interior passage is smallest, said downstream end portion of said first venturi element having an inner diameter which is larger than said narrowest portion, said upstream end portion of said second venturi element being disposed radially outward of said downstream end portion of said first venturi element and said venturi including a circumferentially continuous first annular gap which is defined between said outer surface of said downstream end portion of said first venturi element and said inner surface of said upstream end portion of said second venturi element, said venturi including means in communication with said first annular gap and connected to a gaseous fuel source, said first annular gap being a fuel nozzle and defining a fuel introduction path oriented so that fuel flows therethrough and flows into said air inlet path in a fuel flow direction oriented substantially in parallel with said main air flow direction, said inner diameter within said second venturi element increasing toward said downstream end portion thereof whereat said inner diameter of said second venturi element is largest, said upstream end portion of said third venturi element being disposed radially outward of said downstream end portion of said second venturi element and said venturi including a circumferentially continuous second annular gap which is defined between said outer surface of said downstream end portion of said second venturi element and said inner surface of said upstream end portion of said third venturi element, said venturi including means in communication with said second annular gap and connected to an air source, said second annular gap being an air nozzle and defining an air introduction path oriented so that additional air flows therethrough and flows into said air inlet path in a secondary air flow direction oriented substantially in parallel with said main air flow direction, said inner diameter within said third venturi element increasing toward said downstream end portion thereof whereat said inner diameter of said third venturi element is largest.

2. The mixer according to claim 1 wherein said second annular gap is disposed radially outwards of said first annular gap.

3. The mixer according to claim 1, wherein said first venturi element defines an inlet portion of said air inlet path.

4. The mixer according to claim 3, wherein said second annular gap is in communication with said air inlet path proximate said inlet portion and receives a portion of said inlet air which flows therethrough.

5. The mixer according to claim 1, wherein said means defining said air inlet path includes a tubular body having a body interior passage which defines said air inlet path, said venturi being disposed within said body interior passage proximate an upstream end thereof such that said venturi interior passage is disposed in communication with said body interior passage, at least a portion of said venturi being spaced radially inwards from an interior surface of said body interior passage such that a space is disposed therebetween, said space being in communication with said second annular gap and said air source and defining a portion of said air introduction path.

* * * * *